United States Patent
Bellehumeur et al.

(10) Patent No.: US 12,195,564 B2
(45) Date of Patent: Jan. 14, 2025

(54) ENHANCED ESCR AND DUCTILITY BIMODAL ROTOMOLDING RESIN

(71) Applicant: NOVA Chemicals (International) S.A., Fribourg (CH)

(72) Inventors: Celine Bellehumeur, Calgary (CA); Brian Molloy, Airdrie (CA)

(73) Assignee: NOVA Chemicals (International) S.A., Fribourg (CH)

(*) Notice: Subject to any disclaimer, the term of this patent is extended or adjusted under 35 U.S.C. 154(b) by 567 days.

(21) Appl. No.: 17/613,924

(22) PCT Filed: May 25, 2020

(86) PCT No.: PCT/IB2020/054944
§ 371 (c)(1),
(2) Date: Nov. 23, 2021

(87) PCT Pub. No.: WO2020/240401
PCT Pub. Date: Dec. 3, 2020

(65) Prior Publication Data
US 2022/0227902 A1    Jul. 21, 2022

Related U.S. Application Data

(60) Provisional application No. 62/855,373, filed on May 31, 2019.

(51) Int. Cl.
| | |
|---|---|
| C08F 4/76 | (2006.01) |
| C08F 2/01 | (2006.01) |
| C08F 4/6592 | (2006.01) |
| C08F 210/16 | (2006.01) |

(52) U.S. Cl.
CPC ............. *C08F 210/16* (2013.01); *C08F 2/01* (2013.01); *C08F 4/6592* (2013.01); *C08F 4/76* (2013.01); *C08F 2500/05* (2013.01); *C08F 2500/12* (2013.01)

(58) Field of Classification Search
None
See application file for complete search history.

(56) References Cited

U.S. PATENT DOCUMENTS

| | | |
|---|---|---|
| 5,132,380 A | 7/1992 | Stevens et al. |
| 5,198,401 A | 3/1993 | Turner et al. |
| 5,292,845 A | 3/1994 | Kawasaki et al. |
| 5,376,439 A | 12/1994 | Hodgson et al. |
| 5,382,630 A | 1/1995 | Stehling et al. |
| 5,382,631 A | 1/1995 | Stehling et al. |

(Continued)

FOREIGN PATENT DOCUMENTS

| | | |
|---|---|---|
| WO | WO-2005/121239 A2 | 12/2005 |
| WO | WO-2015/071807 A1 | 5/2015 |

OTHER PUBLICATIONS

ASTM International D790-10; "Standard Test Methods for Flexural Properties of Unreinforced and Reinforced Plastics and Electrical Insulating Materials", Copyright by ASTM Int'l (all rights reserved): Oct. 16, 2019, 11 pages.

(Continued)

*Primary Examiner* — Richard A. Huhn
(74) *Attorney, Agent, or Firm* — Thomas J. Styslinger

(57) ABSTRACT

A polyethylene composition having a high flow index and a bimodal composition provides an outstanding combination of environmental stress crack resistance (ESCR) and ductility in rotomolded articles. The composition is easy to process/mold.

8 Claims, 9 Drawing Sheets

(56) References Cited

U.S. PATENT DOCUMENTS

| | | | |
|---|---|---|---|
| 6,969,741 | B2 | 11/2005 | Lustiger et al. |
| 8,022,143 | B2 | 9/2011 | Wang |
| 8,114,946 | B2 | 2/2012 | Yang et al. |
| 8,475,899 | B2 | 7/2013 | Yang et al. |
| 8,486,323 | B2 | 7/2013 | Davis et al. |
| 8,492,498 | B2 | 7/2013 | Buck et al. |
| 2005/0256266 | A1 | 11/2005 | Lustiger et al. |
| 2013/0310532 | A1 | 11/2013 | Bellehumeur et al. |

OTHER PUBLICATIONS

ASTM International D792-13 "Standard Test Methods for Density and Specific Gravity (Relative Density) of Plastics by Displacement", Copyright by ASTM Int'l (all rights reserved): Feb. 24, 2014, 6 pages.

ASTM International Designation D6474-99 (Reapproved 2006) "Standard Test Method for Determining Molecular Weight Distribution and Molecular Weight Averages of Polyolefins by High Temperature Gel Permeation Chromatography" Copyright by ASTM Int'l (all rights reserved): May 24, 2019, 6 pages.

ASTM International Designation: D1238-13; "Standard Test Method for Melt Flow Rates of Thermoplastics by Extrusion Plastometer" Copyright by ASTM Int'l (all rights reserved): May 24, 2019, 16 pages.

ASTM International Designation: D1693-15 "Standard Test Method for Environmental Stress-Cracking of Ethylene Plastics", Copyright by ASTM Int'l (all rights reserved): Apr. 26, 2017, 11 pages.

ASTM International Designation: D5628-18 "Standard Test Method for Impact Resistance of Flat, Rigid Plastic Specimens by Means of Falling Dart (Tup or Falling Mass)", Copyright by ASTM Int'l (all rights reserved): Oct. 16, 2019, 10 pages.

ASTM International Designation: D638-14; "Standard Method for Tensile Properties of Plastics", Copyright by ASTM Int'l (all rights reserved):Apr. 26, 2017, 17 pages.

ASTM International Designation: D6645-01 (Reapproved 2010) "Standard Test Method for Methyl (Comonomer) Content in Polyethylene by Infrared Spectrophotometry", Copyright by ASTM Int'l (all rights reserved): Mar. 27, 2018, 4 pages.

International Search Report & Written Opinion corresponding to PCT/IB2020/054944, dated Jul. 28, 2020, 8 pages.

James C. Randall, "A Review of High Resolution Liquid 13Carbon Nuclear Magnetic Resonance Characterizations of Ethylene-Based Polymers", JMS—Rev.Macromol.Chem.Phys., C29(2&3), 201-317 (1989).

ENHANCED ESCR AND DUCTILITY BIMODAL ROTOMOLDING RESIN

CROSS-REFERENCE TO RELATED APPLICATIONS

This application is a U.S. National Phase Application under 35 U.S.C. 371 of International Patent Application No. PCT/IB2020/054944, filed on May 25, 2020, which in turn claims priority to and the benefit of U.S. Provisional Application No. 62/855,373, filed on May 31, 2019, all of which are incorporated herein by reference in their entirety.

TECHNICAL FIELD

The present disclosure relates to polyethylene compositions for use in rotomolding articles. The compositions have exceptional environmental stress crack resistance (ESCR) and ductility. The compositions also have a high flow index, which facilitates molding, especially for larger parts.

BACKGROUND ART

There are a number of different considerations for manufacturing a resin suitable for use in rotomolding manufacture. The resin needs to be: capable of production at commercially acceptable rates of production; suitable for use in the rotomolding process (e.g., for example, having a suitable sintering temperature and a suitable cooling rate to be removed from the mold); and finally have suitable properties for the end use application. One important property sought is environmental stress crack resistance. The resin should not develop cracks due to exposure to chemicals, sunlight, etc. in applications, such as, tank sprayers for agricultural use, cisterns, and smaller rotomolded parts.

U.S. Pat. Nos. 5,382,630, and 5,382,631 issued Jan. 17, 1995 to Stehling, assigned to Exxon, teach bimodal resins having superior physical properties. The patent requires that the blend have two or more components each having a polydispersity (Mw/Mn) less than 3 and the blend having a polydispersity greater than 3 and no component in the blend having a relatively higher molecular weight and a lower comonomer content (i.e., the comonomer incorporation is reverse). The reference does not suggest improved ESCR.

U.S. Pat. No. 6,969,741 issued Nov. 29, 2005 to Lustiger et al., assigned to ExxonMobil teaches a blend of polyethylenes suitable for rotomolding. The patent teaches the difference in the density of each component is not less than 0.030 g/cm$^3$. The difference in the densities of the component polymers in the present composition is less than 0.030 g/cm$^3$.

U.S. Pat. No. 8,486,323 issued Jul. 16, 2013 in the name of Davis, assigned to Dow Global technologies Inc., teaches polymer blends used in rotational molded articles and having a high impact resistance. The blends have a residual unsaturation of less than 0.06 per 1000 carbon atoms.

U.S. Pat. No. 8,492,498 issued Jul. 23, 2013 from an application filed Feb. 21, 2011 in the name of Buck et al., assigned to Chevron Phillips discloses a high density polymer suitable for rotational molding that has a bent strip ESCR condition A greater than 1000 hours, as determined by ASTM D 1693 in 100% IGEPAL® CO-630.

U.S. Pat. No. 8,114,946 issued Feb. 14, 2012, and U.S. Pat. No. 8,475,899 issued Jul. 2, 2013, both claiming a priority date of Dec. 18, 2008 in the name of Yang et al., assigned to Chevron Phillips teach a polymer prepared using a bridged metallocene catalyst and having a long chain branch (LCB) content of less than 0.008 per 1000 carbon atoms, by implication LCB are present in the polymer. The catalyst and process used to make the compositions of the present disclosure do not produce detectable long chain branching.

Thus, in summary, it has been difficult to prepare a rotomolding resin having both high flow rates (to facilitate molding) and good ESCR.

SUMMARY OF INVENTION

One embodiment provides:
a bimodal polyethylene composition having a density from 0.934 to 0.940 g/cm$^3$, a melt index $I_2$ determined according to ASTM D 1238 (2.16 kg 190° C.—$I_2$) from 4.0 to 7.0 g/10 min, an $I_{21}$ determined according to ASTM D 1238 (21.6 kg 190° C.—$I_{21}$) from 140 to 170 g/10 min, an $I_{21}/I_2$ from 27 to 36, a bent strip ESCR as determined by ASTM D 1693 in 100% octoxynol-9 for conditions A and B of greater than 1,000 hours, a bent strip ESCR as determined by ASTM D1693 in 10% octoxyn 1-9 for conditions B10 of greater than 70 hours, a number average molecular weight (Mn) from 11,000 to 35,000 as determined by GPC, a weight average molecular weight (Mw) from 55,000 to 82,000 as determined by GPC, an overall Mw/Mn from 2.2 to 2.6, comprising from 4 to 5 weight % (wt. %) of one or more C$_{4-8}$ alpha olefin comonomers as determined by FTIR which when de-convoluted into two components consists of: (i) from 20 to 45 wt. % of a first component consisting of from 1 to 25 wt. % of one or more C$_{4-8}$ alpha olefin comonomers and the balance ethylene, said component having a density as determined according to ASTM D 792 from 0.915 to 0.925 g/cm$^3$; a weight average molecular weight (Mw) from 180,000 to 220,000 g/mol, a Mw/Mn of from 2 to 3; and (ii) from 80 to 55 wt. % of a second component comprising one or more C$_{4-8}$ alpha olefin comonomers and the balance ethylene said component having a density as determined according to ASTM D 792 from 0.940 to 0.945 g/cm$^3$, a weight average molecular weight (Mw) from 30,000 to 50,000, and a Mw/Mn of from 2 to 3.

Another embodiment provides a bimodal polyethylene composition as above wherein component (i) is present in an amount from about 20 to about 35 wt. %.

Another embodiment provides a bimodal polyethylene composition as above wherein said one or more comonomers consists essentially of 1-octene.

A further embodiment provides a bimodal polyethylene composition as above wherein component (ii) is present in an amount from about 65 to about 80 wt. %.

Another embodiment provides a bimodal polyethylene composition as above wherein component (ii) has a weight average molecular weight (Mw) from about 30,000 to about 50,000 and a polydispersity of less than 2.5.

Another embodiment provides a process to make a bimodal polyethylene composition as above, comprising feeding ethylene and one or more C$_{4-8}$ comonomers to two sequential solution phase reactors, in the presence of a single site catalyst comprising a phosphinimine ligand together with one or more activators. In an embodiment, the catalyst is defined by the formula:

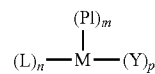

wherein M is selected from the group consisting of Ti, Zr and Hf; PI is a phosphinimine ligand of the formula:

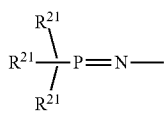

wherein each $R_{21}$ is independently selected from the group consisting of a hydrogen atom; a halogen atom; hydrocarbyl radicals, typically, $C_{1-10}$, which are unsubstituted by or further substituted by a halogen atom; $C_{1-8}$ alkoxy radicals; $C_{6-10}$ aryl or aryloxy radicals; amido radicals; silyl radicals of the formula:

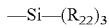

wherein each $R_{22}$ is independently selected from the group consisting of hydrogen, a $C_{1-8}$ alkyl or alkoxy radical and $C_{6-10}$ aryl or aryloxy radicals; and a germanyl radical of the formula:

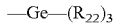

wherein $R^{22}$ is as defined above; L is a monoanionic cyclopentadienyl-type ligand independently selected from the group consisting of cyclopentadienyl-type ligands, Y is independently selected from the group consisting of activatable ligands; m is 1 or 2; n is 0 or 1; p is an integer and the sum of m+n+p equals the valence state of M.

In an embodiment, hydrogen is added to both reactors as follows: i) in an amount of from 0.5 to 1.5 parts per million by weight (ppm) in the first reactor and ii) from 1.5 to 3.0 ppm in the second reactor.

A further embodiment provides a rotomolded part consisting essentially of the above bimodal polyethylene composition. In another embodiment, rotomolded parts made from the above bimodal polyethylene composition exhibit ductile failure.

DESCRIPTION OF EMBODIMENTS

Numbers Ranges

Other than in the operating examples or where otherwise indicated, all numbers or expressions referring to quantities of ingredients, reaction conditions, etc. used in the specification and claims are to be understood as modified in all instances by the term "about". Accordingly, unless indicated to the contrary, the numerical parameters set forth in the following specification and attached claims are approximations that can vary depending upon the desired properties of the disclosed embodiments. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of this disclosure are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

Figure 1:
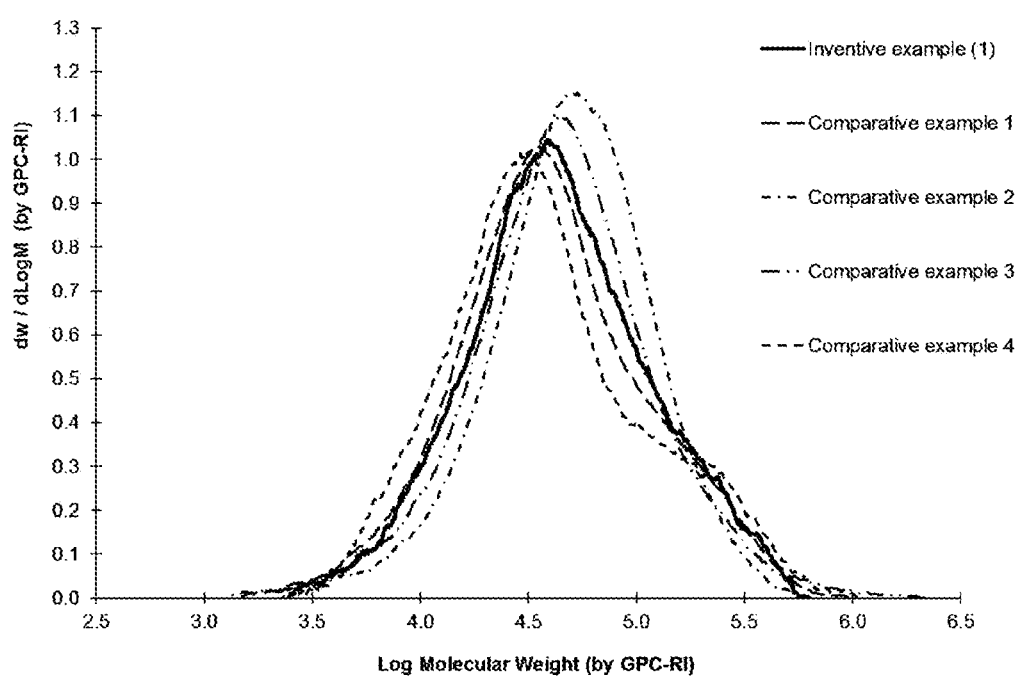
FIG. 1 is a plot of the molecular weight distribution obtained by gel permeation chromatograph (GPC), of a resin of example 1 and comparative examples.
Figure 2:
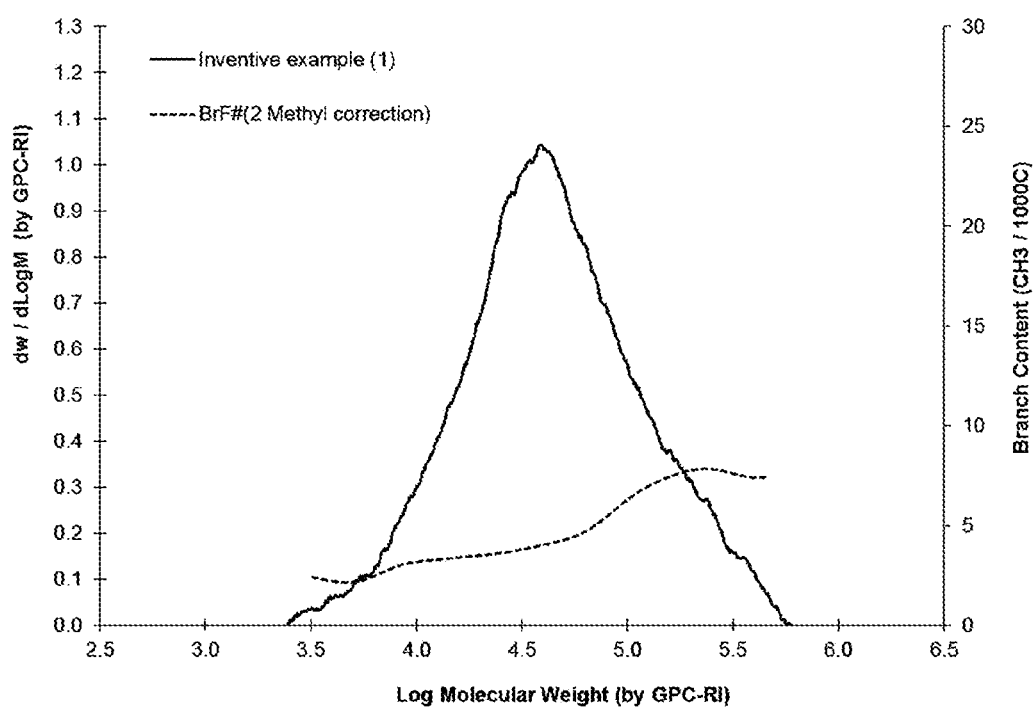
FIG. 2 is a plot of the molecular weight distribution obtained by GPC, and the short chain branching distribution determined from GPC-FTIR of a resin of example 1.
Figure 3:
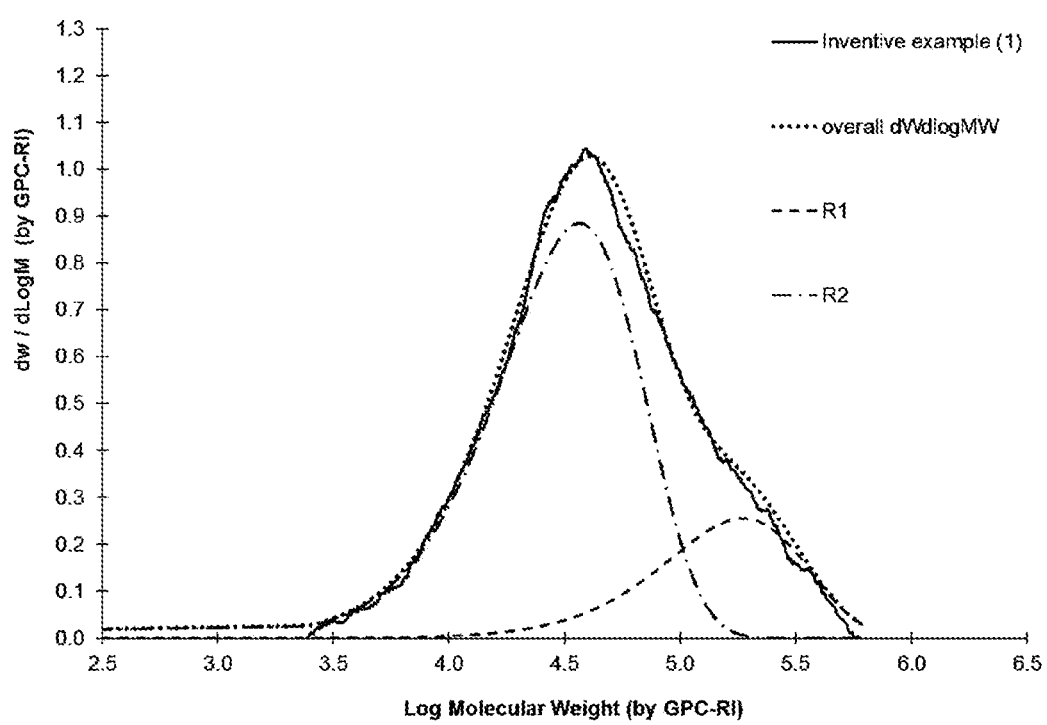
FIG. 3 is a plot of the molecular weight distribution obtained by GPC of the polymer of example 1 and the computer model predictions of the molecular weight distributions of the first and second ethylene polymers that comprise the polymer of example 1.
Figure 4:
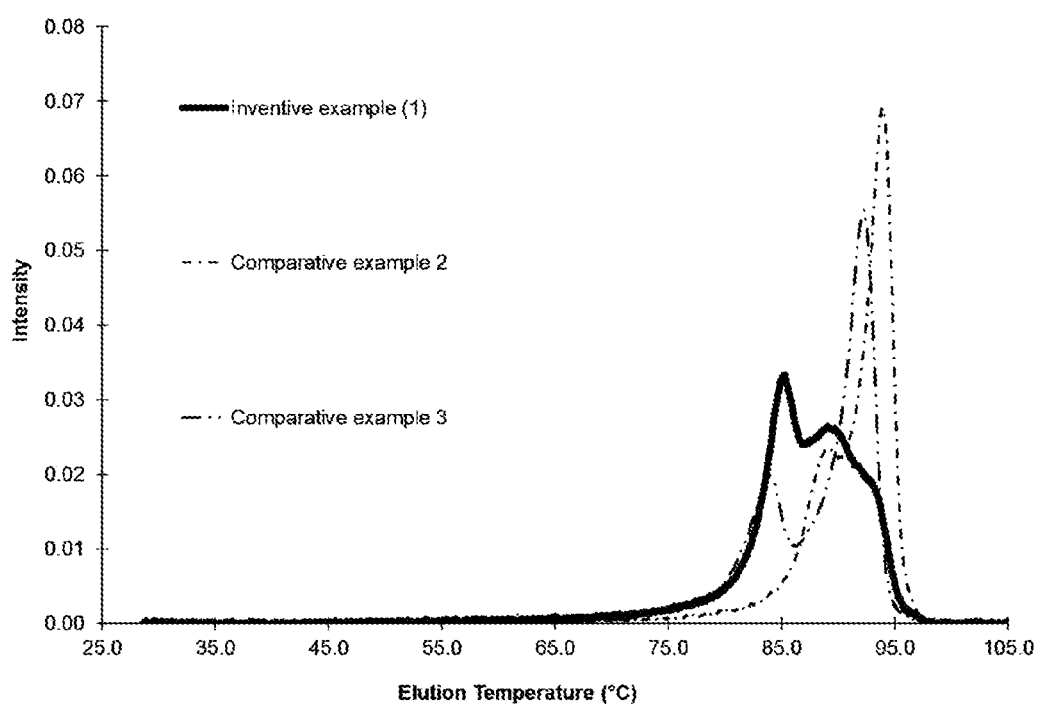
FIG. 4 is a plot of temperature rising elution fractionation profiles (TREF) of the polymer of example 1 and comparative examples 3 and 4.
Figure 5:
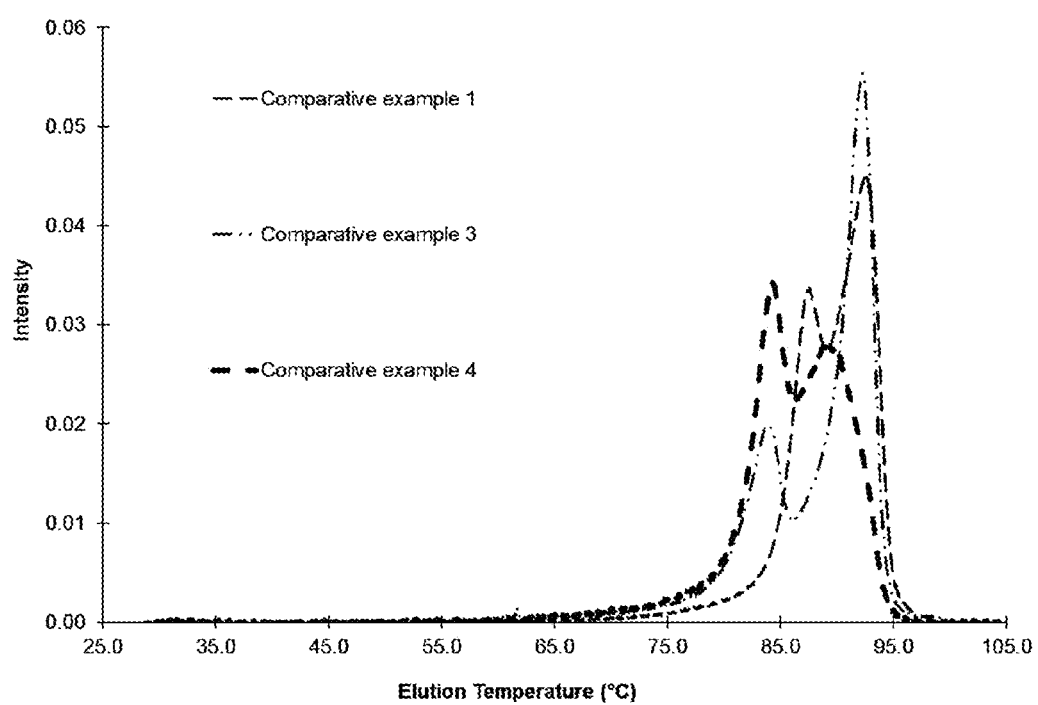
FIG. 5 is a plot of TREF of the polymer of comparative examples 1, 3 and 4.

The compositions of the present disclosure are bimodal polyethylene and can be de-convoluted into two distinct components. Typically, this is demonstrated by the presence of a "shoulder" at the right side of a gel permeation chromatography (GPC) curve (FIG. 1). In the present case, there is a small shoulder to the right side of the GPC curve as shown in FIG. 2 indicating a small amount of a higher molecular weight low density component.

The overall polyethylene composition is narrowly defined with respect to comonomer content and contains from about 4 to about 5 wt. % of one or more $C_{6-8}$ alpha olefins and the balance ethylene. In an embodiment, the comonomer is 1-octene or 1-hexene, especially 1-octene.

In one embodiment, the higher molecular weight component is present in an amount from about 20 to about 45 wt.

% of the entire composition, especially from about 20 to about 35 wt. %, most especially from about 25 to about 30 wt. %, based on the weight of the entire composition. The lower molecular weight component is present in corresponding amounts from about 80 to about 55 wt. %, of the entire composition, especially from about 80 to about 65 wt. %, most especially from about 75 to about 70 wt. % based on the weight of the entire composition.

The higher molecular weight component has a weight average molecular weight (Mw) from about 180,000 to about 220,000, as determined using gel permeation chromatography (GPC). The higher molecular weight component has a polydispersity (Mw/Mn: weight average molecular weight/number average molecular weight)) less than 2.5. The melt index, $I_2$, of the overall composition is from about 4 to 7. It is unusual for a bimodal composition having this $I_2$ value (which is relatively high) while still having a first blend component with an Mw of greater than 180,000.

While not wishing to be bound by theory, it is believed that this combination (i.e. $I_2$ of from 4 to 7 and Mw of first blend component of greater than 180,000) is essential to this invention.

The higher molecular weight component has a lower density than the lower molecular weight component. The density of the higher molecular weight component in the composition may range from about 0.915 to about 0.925 g/cm$^3$. The density of the component, or that of any other component or the total composition, is a function of the degree of comonomer incorporation. In an embodiment, the higher molecular weight component does not have any long chain branching.

The lower molecular weight component has a weight average molecular weight (Mw) less than about 100,000, typically, from about 30,000 to about 50,000, as determined using gel permeation chromatography (GPC). The lower molecular weight component has a polydispersity (Mw/Mn) less than 2.5.

The lower molecular weight component has a higher density than the higher molecular weight component. The density of the lower molecular weight component in the composition is greater than about 0.940 g/cm$^3$, typically from about 0.940 to about 0.945 g/cm$^3$. In an embodiment, the lower molecular weight component does not have any long chain branching.

In an embodiment, the catalysts used to produce the bimodal polyethylene compositions do not produce long chain branching.

The overall properties of the bimodal polyethylene compositions include the following:
  density from about 0.934 to about 0.940 g/cm$^3$;
  melt index under a load of 2.16 kg ($I_2$) at a temperature of 190° C. as determined by ASTM 1238 from about 4 to about 7, and, in some cases, from about 4.5 to about 6 g/10 minutes;
  a melt index under a load of 21.6 kg ($I_{21}$) at a temperature of 190° C. as determined by ASTM 1238 from about 140 to about 170, and, in some cases, from about 140 to about 160 g/10 minutes;
  a melt flow ratio ($I_{21}/I_2$) from about 27 to about 36;
  an ESCR at Condition B, 10% IGEPAL® CO-630 greater than 70 hours;
  an ESCR at condition A 100% IGEPAL CO-630 (octoxynol-9) greater than 1,000 hours; and
  an ESCR at condition B 100% IGEPAL CO-630 greater than 1,000 hours.

Overall, the composition includes from about 4 to about 5 wt. %, of one or more $C_{4-8}$ comonomers.

The overall bimodal polyethylene composition incorporates the following molecular features:
  short chain branch frequency/1000 carbon atoms by FTIR between about 5 and about 7;
  comonomer content (wt. %) by FTIR from about 4 to about 5;
  number average molecular weight (Mn) by GPC from about 15,000 to about 35,000, and, in some cases, from about 25,000 to about 30,000;
  weight average molecular weight Mw) by GPC from about 55,000 to about 82,000, and, in some cases, from about 60,000 to about 75,000; and
  polydispersity (Mn/Mw) from about 2.0 to 2.6.

The polymer may be made using a solution polymerization technique. In the solution polymerization of ethylene with one or more comonomers, non-limiting examples of comonomers include $C_{3-8}$ a-olefins; in some cases, 1-hexene or 1-octene are used, especially 1-octene. Monomers are typically dissolved in an inert hydrocarbon solvent, typically, a $C_{5-12}$ hydrocarbon, which may be unsubstituted or substituted by a $C_{1-4}$ alkyl group, such as pentane, methyl pentane, hexane, heptane, octane, cyclohexane, methylcyclohexane and hydrogenated naphtha. An example of a suitable solvent that is commercially available is "Isopar E" ($C_{8-12}$ aliphatic solvent, Exxon Chemical Co.).

Catalyst and activators are also dissolved in the solvent or suspended in a diluent miscible with the solvent at reaction conditions.

Catalyst

In an embodiment, the catalyst is a compound of the formula:

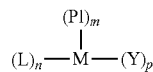

wherein M is selected from the group consisting of Ti, Zr and Hf; PI is a phosphinimine ligand of the formula:

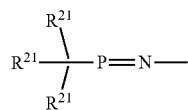

wherein each $R_{21}$ is independently selected from the group consisting of a hydrogen atom; a halogen atom; hydrocarbyl radicals, typically, $C_{1-10}$, which are unsubstituted by or further substituted by a halogen atom; $C_{1-8}$ alkoxy radicals; $C_{6-10}$ aryl or aryloxy radicals; amido radicals; silyl radicals of the formula:

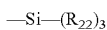

wherein each $R^{22}$ is independently selected from the group consisting of hydrogen, a $C_{1-8}$ alkyl or alkoxy radical and $C_{6-10}$ aryl or aryloxy radicals; and a germanyl radical of the formula:

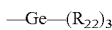

wherein $R^{22}$ is as defined above; L is a monoanionic cyclopentadienyl-type ligand independently selected from the group consisting of cyclopentadienyl-type ligands, Y is independently selected from the group consisting of activatable ligands; m is 1 or 2; n is 0 or 1; p is an integer and the sum of m+n+p equals the valence state of M.

Suitable phosphinimines are those in which each $R^{21}$ is a hydrocarbyl radical, especially a $C_{1-6}$ hydrocarbyl radical, most especially a $C_{1-4}$ hydrocarbyl radical.

The term "cyclopentadienyl" refers to a 5-member carbon ring having delocalized bonding within the ring and, typically, being bound to the active catalyst site, generally, a group 4 metal (M) through eta-5-bonds. The cyclopentadienyl ligand may be unsubstituted or up to fully substituted with one or more substituents selected from the group consisting of $C_{1-10}$ hydrocarbyl radicals which are unsubstituted or further substituted by one or more substituents selected from the group consisting of a halogen atom and a $C_{1-4}$ alkyl radical; a halogen atom; a $C_{1-8}$ alkoxy radical; a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—(R)$_3$ wherein each R is independently selected from the group consisting of hydrogen, a $C_{1-8}$ alkyl or alkoxy radical, $C_{6-10}$ aryl or aryloxy radicals; and germanyl radicals of the formula Ge—(R)$_3$ wherein R is as defined above.

The cyclopentadienyl-type ligand may be selected from the group consisting of a cyclopentadienyl radical, an indenyl radical and a fluorenyl radical, which radicals are unsubstituted or up to fully substituted by one or more substituents selected from the group consisting of a fluorine atom, a chlorine atom; $C_{1-4}$ alkyl radicals; and a phenyl or benzyl radical which is unsubstituted or substituted by one or more fluorine atoms.

Activatable ligands Y may be selected from the group consisting of a halogen atom, $C_{1-4}$ alkyl radicals, $C_{6-20}$ aryl radicals, $C_{7-12}$ arylalkyl radicals, $C_{6-10}$ phenoxy radicals, amido radicals which may be substituted by up to two $C_{1-4}$ alkyl radicals and $C_{1-4}$ alkoxy radicals. In some cases, Y is selected from the group consisting of a chlorine atom, a methyl radical, an ethyl radical and a benzyl radical.

Suitable phosphinimine catalysts are Group 4 organometallic complexes which contain one phosphinimine ligand (as described above) and one cyclopentadienyl-type (L) ligand and two activatable ligands. The catalysts are not bridged.

Activators

The activators for the catalyst are typically selected from the group consisting of aluminoxanes (also known as alumoxanes to those skilled in the art) and ionic activators.

Alumoxanes

Suitable alumoxane may be of the formula: $(R^4)_2AlO(R^4AlO)_mAl(R_4)_2$ wherein each $R^4$ is independently selected from the group consisting of $C_{1-20}$ hydrocarbyl radicals and m is from 0 to 50. In an embodiment, $R^4$ is a $C_{1-4}$ alkyl radical and m is from 5 to 30. A non-limiting example of a suitable alumoxane is methylalumoxane (or "MAO") in which each R is methyl.

Alumoxanes are well known as cocatalysts, particularly for metallocene-type catalysts. Alumoxanes are also readily available articles of commerce.

The use of an alumoxane cocatalyst generally requires a molar ratio of aluminum to the transition metal in the catalyst from about 20:1 to about 1000:1; or, in other cases, from about 50:1 to about 250:1.

Commercially available MAO typically contains free aluminum alkyl (e.g., trimethylaluminum or "TMA") which may reduce catalyst activity and/or broaden the molecular weight distribution of the polymer. If a narrow molecular weight distribution polymer is required, it is known to treat such commercially available MAO with an additive which is capable of reacting with the TMA; non-limiting examples of suitable additives include alcohols or hindered phenols.

"Ionic Activators" Cocatalysts

So-called "ionic activators" are also well known for metallocene catalysts. See, for example, U.S. Pat. No. 5,198, 401 (Hlatky and Turner) and U.S. Pat. No. 5,132,380 (Stevens and Neithamer) both of which are incorporated by reference.

While not wishing to be bound by any theory, it is thought by those skilled in the art that "ionic activators" initially cause the abstraction of one or more of the activatable ligands in a manner which ionizes the catalyst into a cation, then provides a bulky, labile, non-coordinating anion which stabilizes the catalyst in a cationic form. The bulky, non-coordinating anion permits olefin polymerization to proceed at the cationic catalyst center (presumably, because the non-coordinating anion is sufficiently labile to be displaced by monomer which coordinates to the catalyst. Non-limiting examples of ionic activators are boron-containing ionic activators such as:

compounds of the formula $[R^5]^+[B(R^7)_4]^-$ wherein B is a boron atom, $R^5$ is an aromatic hydrocarbyl (e.g., triphenyl methyl cation) and each $R^7$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—(R$^9$)$_3$; wherein each $R^9$ is independently selected from the group consisting of a hydrogen atom and a $C_{1-4}$ alkyl radical; and compounds of the formula $[(R^8)_tZH]+[B(R^7)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^7$ is as defined above; and compounds of the formula $B(R^7)_3$ wherein $R^7$ is as defined above.

In some of the above compounds, $R^7$ is a pentafluorophenyl radical, and $R^5$ is a triphenylmethyl cation, Z is a nitrogen atom and $R^8$ is a $C_{1-4}$ alkyl radical or $R^8$ taken together with the nitrogen atom forms an anilinium radical which is substituted by two $C_{1-4}$ alkyl radicals.

The "ionic activator" may abstract one or more activatable ligands so as to ionize the catalyst center into a cation but not to covalently bond with the catalyst and to provide sufficient distance between the catalyst and the ionizing activator to permit a polymerizable olefin to enter the resulting active site.

Examples of ionic activators include: triethylammonium tetra(phenyl)boron; tripropylammonium tetra(phenyl)boron; tri(n-butyl)ammonium tetra(phenyl)boron; trimethylammonium tetra(p-tolyl)boron; trimethylammonium tetra(o-tolyl) boron; tributylammonium tetra(pentafluorophenyl)boron; tripropylammonium tetra(o,p-dimethylphenyl)boron; tributylammonium tetra(m,m-dimethylphenyl)boron; tributylammonium tetra(p-trifluoromethylphenyl)boron; tributylammonium tetra(pentafluorophenyl)boron; tri(n-butyl)ammonium tetra(o-tolyl)boron; N,N-dimethylanilinium tetra(phenyl)boron; N,N-diethylanilinium tetra (phenyl)boron; N,N-diethylanilinium tetra(phenyl)n-butylboron; N,N-2,4,6-pentamethylanilinium tetra(phenyl) boron; di-(isopropyl)ammonium tetra(pentafluorophenyl) boron; dicyclohexylammonium tetra(phenyl)boron;

triphenylphosphonium tetra(phenyl)boron; tri(methylphenyl)phosphonium tetra(phenyl)boron; tri(dimethylphenyl)phosphonium tetra(phenyl)boron; tropillium tetrakispentafluorophenyl borate; triphenylmethylium tetrakispentafluorophenyl borate; benzene(diazonium)tetrakispentafluorophenyl borate; tropillium phenyltrispentafluorophenyl borate; triphenylmethylium phenyltrispentafluorophenyl borate; benzene(diazonium) phenyltrispentafluorophenyl borate; tropillium tetrakis(2,3,5,6-tetrafluorophenyl)borate; triphenylmethylium tetrakis(2,3,5,6-tetrafluorophenyl)borate; benzene(diazonium)tetrakis(3,4,5-trifluorophenyl)borate; tropillium tetrakis(3,4,5-trifluorophenyl)borate; benzene(diazonium)tetrakis(3,4,5-trifluorophenyl)borate; tropillium tetrakis(1,2,2-trifluoroethenyl)borate; triphenylmethylium tetrakis(1,2,2-trifluoroethenyl)borate; benzene(diazonium)tetrakis(1,2,2-trifluoroethenyl)borate; tropillium tetrakis(2,3,4,5-tetrafluorophenyl)borate; triphenylmethylium tetrakis(2,3,4,5-tetrafluorophenyl)borate; and benzene(diazonium)tetrakis(2,3,4,5-tetrafluorophenyl)borate.

Readily commercially available ionic activators include: N,N-dimethylaniliniumtetrakispentafluorophenyl borate; triphenylmethylium tetrakispentafluorophenyl borate; and trispentafluorophenyl borane.

The ionic activator may be use at about molar equivalents of boron to group IV metal in the catalyst. Suitable molar ratios of group IV metal from the catalyst to boron may range from about 1:1 to about 3:1, in other cases, from about 1:1 to about 1:2.

In some instances, the ionic activator may be used in combination with an alkylating activator (which may also serve as a scavenger). The ionic activator may be selected from the group consisting of $(R^3)_p MgX_{2-p}$ wherein X is a halide and each $R^3$ is independently selected from the group consisting of $C_{1-10}$ alkyl radicals and p is 1 or 2; $R^3Li$ wherein $R^3$ is as defined above; $(R^3)_q ZnX_{2-q}$ wherein $R^3$ is as defined above, X is halogen and q is 1 or 2; $(R^3)_s AlX_{3-s}$ wherein $R^3$ is as defined above, X is halogen and s is an integer from 1 to 3. In some of the above compounds, $R^3$ is a $C_{1-4}$ alkyl radical, and X is chlorine. Commercially available compounds include triethyl aluminum (TEAL), diethyl aluminum chloride (DEAC), dibutyl magnesium ((Bu)$_2$Mg), and butyl ethyl magnesium (BuEtMg or BuMgEt).

If the phosphinimine catalyst is activated with a combination of ionic activators (e.g., boron compounds) and alkylating agent, the molar ratio of group IV metal from the catalyst:metalloid (boron) from the ionic activator:metal from the alkylating agent may range from about 1:1:1 to about 1:3:10, in other cases from about 1:1.3:5 to about 1:1.5:3.

Polymerization Process

The temperature of the reactor(s) in a high temperature solution process is from about 80° C. to about 300° C., in other cases, from about 120° C. to 250° C. The upper temperature limit will be influenced by considerations that are well known to those skilled in the art, such as a desire to maximize operating temperature (so as to reduce solution viscosity), while still maintaining good polymer properties (as increased polymerization temperatures generally reduce the molecular weight of the polymer). In general, the upper polymerization temperature may be between about 200 and about 300° C. A process that uses two reactors may be conducted at two temperatures with the temperature of the second reactor being higher than that of the first reactor. A particularly suitable reaction process is a "medium pressure process", meaning that the pressure in the reactor(s) is normally less than about 6,000 psi (about 42,000 kiloPascals or kPa). In some embodiments of the medium pressure process, pressures are from about 10,000 to about 40,000 kPa (1,450-5,800 psi), especially from about 14,000 to about 22,000 kPa (2,000 psi to 3,000 psi).

In some reaction schemes, the pressure in the reactor system should be high enough to maintain the polymerization solution as a single phase solution and to provide the necessary upstream pressure to feed the polymer solution from the reactor system through a heat exchanger system and to a devolatilization system. Other systems permit the solvent to separate into a polymer rich and polymer lean stream to facilitate polymer separation.

The solution polymerization process may be conducted in a stirred "reactor system" comprising one or more stirred tank reactors or in one or more loop reactors or in a mixed loop and stirred tank reactor system. The reactors may be in tandem or parallel operation. In a dual tandem reactor system, the first polymerization reactor often operates at lower temperature. The residence time in each reactor will depend on the design and the capacity of the reactor. Generally, the reactors should be operated under conditions to achieve a thorough mixing of the reactants. In an embodiment, from about 20 to about 60 wt. % of the final polymer is polymerized in the first reactor, with the balance being polymerized in the second reactor.

A useful solution polymerization process uses at least two polymerization reactors in series (a "multi reactor process"). The polymerization temperature in the first reactor is from about 80° C. to about 180° C. (in other cases, from about 120° C. to 160° C.) and the second reactor is typically operated at a higher temperature (up to about 220° C.). In an embodiment, this multi reactor process is a "medium pressure process", meaning that the pressure in each reactor is normally less than about 6,000 psi (about 42,000 kilopascals or kPa), especially from about 2,000 psi to about 3,000 psi (about 14,000 to about 22,000 kPa).

EXAMPLES

Test Methods

Mn, Mw and Mz (g/mol) were determined by high temperature Gel Permeation Chromatography (GPC) with differential refractive index detection using universal calibration (e.g., ASTM-D646-99). The molecular weight distribution (MWD) is the ratio of the weight average molecular weight (Mw) over the number average molecular weight (Mn).

GPC-FTIR was used to determine the comonomer content as a function of molecular weight. After separation of the polymer by GPC, an on-line FTIR measures the concentration of the polymer and methyl end groups. Methyl end groups are used in the branch frequency calculations. Conventional calibration allows for the calculation of a molecular weight distribution.

Mathematical de-convolutions were performed to determine the relative amount of polymer, molecular weight, and comonomer content of the component made in each reactor by assuming that each polymer component follows a Flory's molecular weight distribution function, and it has a homogeneous comonomer distribution across the whole molecular weight range. The uniform comonomer distribution of each resin component, which is the result from the use of a single site catalyst, allowed the estimation of the short chain branching content (SCB), in branches per 1000 carbon atoms for the first and second ethylene polymers, based on the de-convoluted relative amounts of first and second ethylene polymer components in the polyethylene composition, and their estimated resin molecular weight parameters from the above procedure.

The short chain branch frequency (SCB per 1000 carbon atoms) of copolymer samples was determined by Fourier Transform Infrared Spectroscopy (FTIR) as per ASTM D6645-01. A Thermo-Nicolet 750 Magna-IR Spectrophotometer was used for the measurement. FTIR was also used to determine internal, side chain and terminal levels of unsaturation.

Comonomer content can also be measured using $^{13}$C NMR techniques as discussed in Randall Rev. Macromol. Chem. Phys., C29 (2&3), p. 285; U.S. Pat. No. 5,292,845 and WO 2005/121239.

Information about the composition distribution was also obtained from temperature raising elution fractionation (TREF). A polymer sample (80 to 100 mg) was introduced into the reactor vessel of the Polymer Char crystal-TREF unit. The reactor vessel was filled with 35 ml 1,2,4-trichlorobenzene (TCB), heated to the desired dissolution temperature (e.g. 150° C.) for 2 hours. The solution (1.5 ml) was then loaded into the TREF column filled with stainless steel beads. After allowed to equilibrate at a given stabilization temperature (e.g. 110° C.) for 45 minutes, the polymer solution was allowed to crystallize with a temperature drop from the stabilization temperature to 30° C. (0.09° C./minute). After equilibrating at 30° C. for 30 minutes, the crystallized sample was eluted with TCB (0.75 mL/minute) with a temperature ramp from 30° C. to the stabilization temperature (0.25° C./minute). The TREF column was cleaned at the end of the run for 30 minutes at the dissolution temperature. The data were processed using Polymer Char software, Excel spreadsheet and TREF software developed in-house.

CDBI is defined to be the percent of polymer whose composition is within 50% of the median comonomer composition. It is calculated from the composition distribution cure and the normalized cumulative integral of the composition distribution curve, as illustrated in U.S. Pat. No. 5,376,439.

Figure 6:
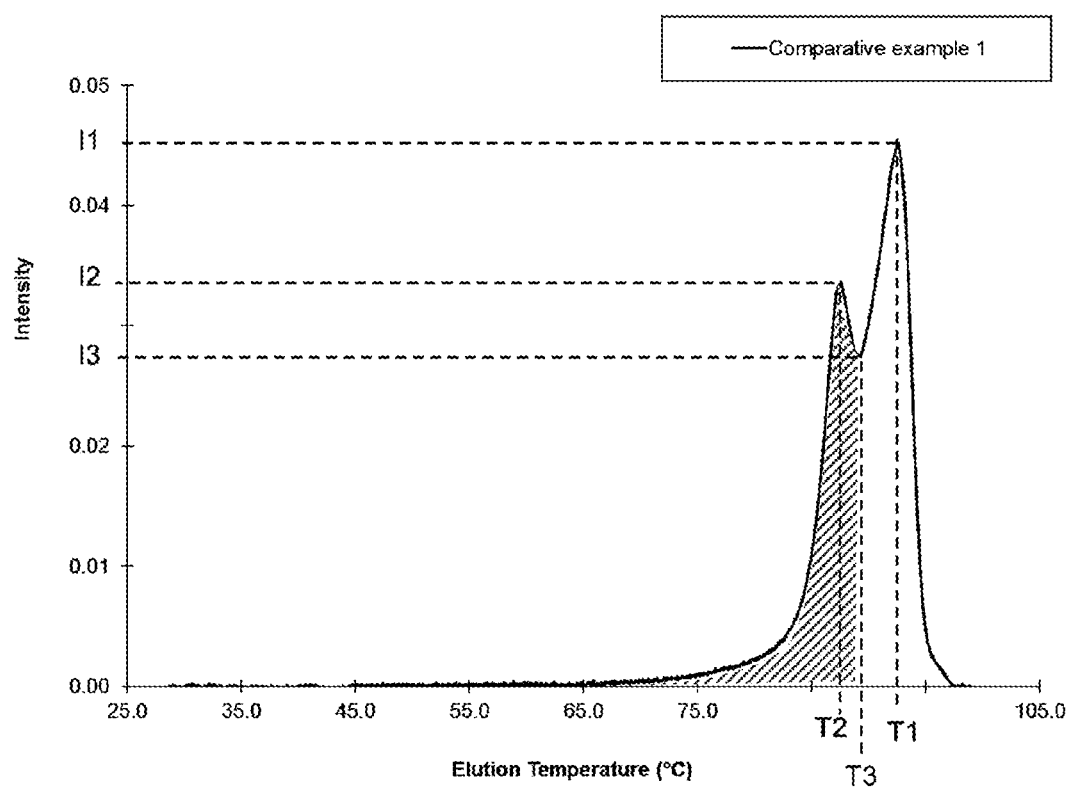
FIG. 6 is a plot of TREF of the polymer of comparative example 1.
Figure 7:
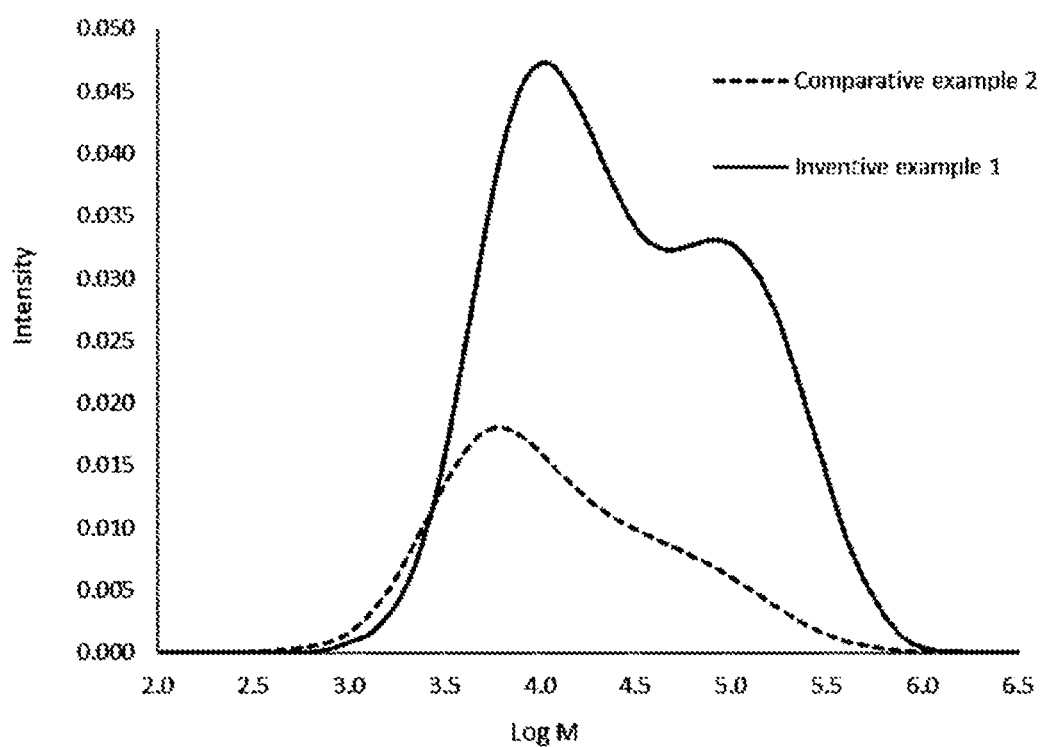
FIG. 7 presents results from cross-fractionation chromatography obtained with polymers of inventive example 1 and comparative example 2, the plot of molecular weight distributions obtained from GPC on elution fractions obtained at 80° C.
Figure 8:
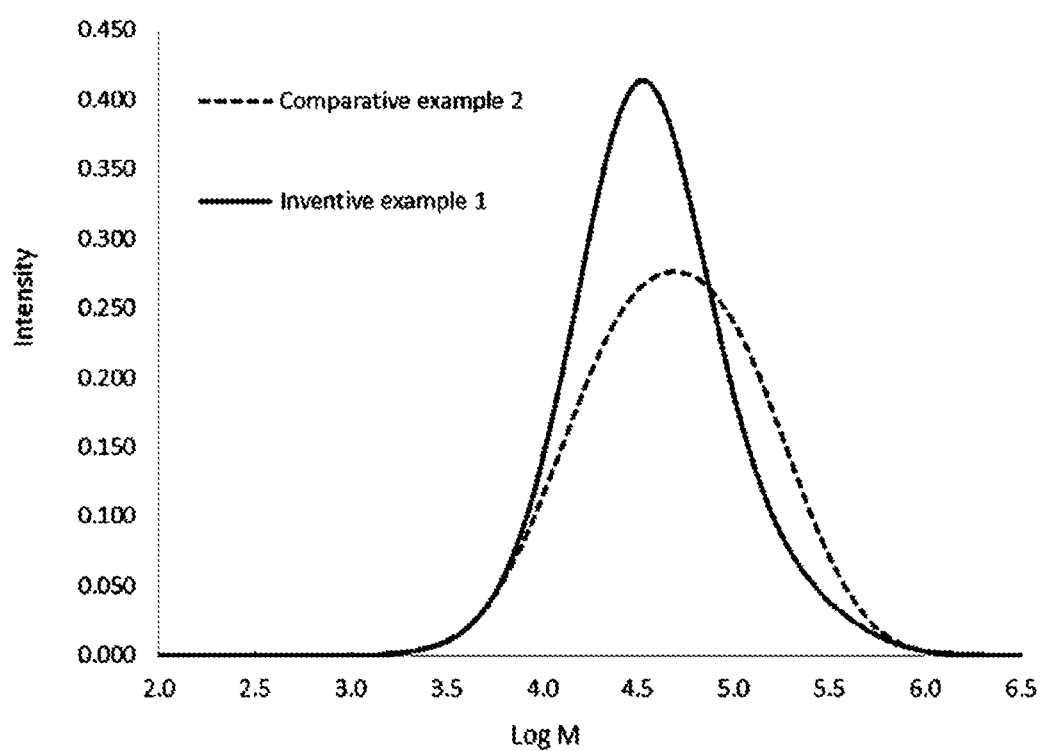
FIG. 8 presents results from cross-fractionation chromatography obtained with polymers of inventive example 1 and comparative example 2, the plot of molecular weight distributions obtained from GPC on elution fractions obtained at 89° C.
Figure 9:
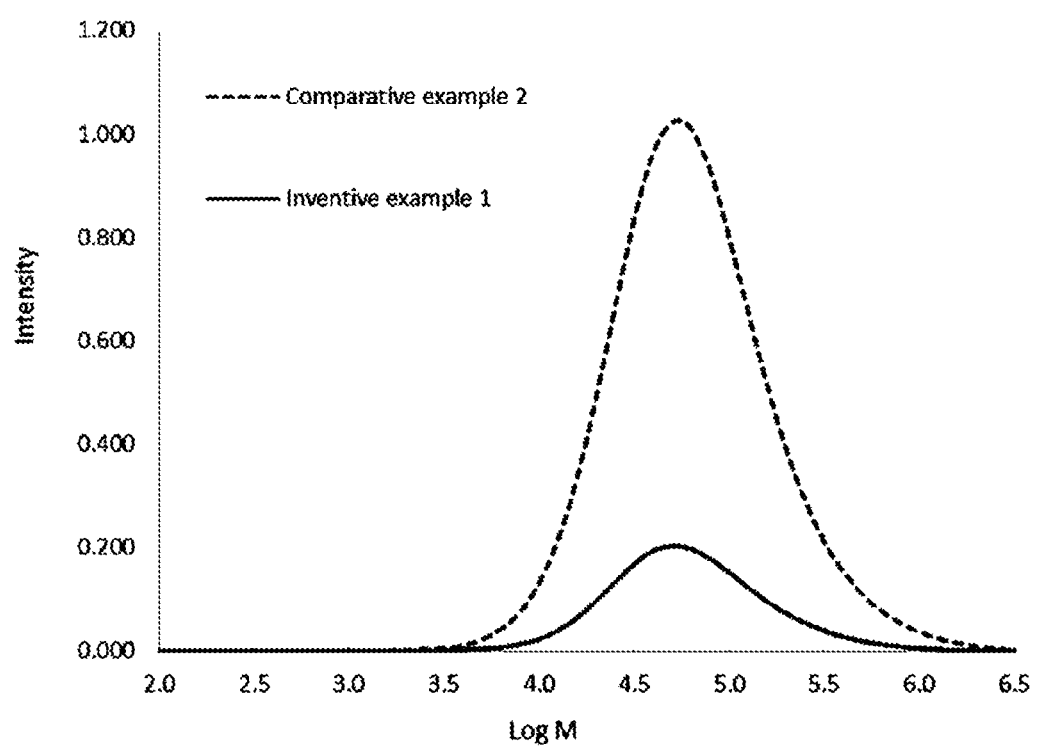
FIG. 9 presents results from cross-fractionation chromatography obtained with polymers of inventive example 1 and comparative example 2, the plot of molecular weight distributions obtained from GPC on elution fractions obtained at 94° C.

We define the following quantities from TREF profiles (FIG. 6):

T1: High elution peak temperature
I1: Intensity of the high temperature elution peak
T2: Low elution peak temperature
I2: Intensity of the low temperature elution peak
T3: Temperature marking the separation between the high and low temperatures elution peaks
I3: Intensity of the elution signal at T3.
Peak intensity ratio: I1/I2

Characterize the TREF profile with the slope between the two primary peaks: (I1−I2)/(T1−T2)

Weight fraction of low elution peak is defined as the area under the curved for temperatures ≤T3. Illustrated in the figure above as the dashed area.

Cross-fractionation chromatography (CFC) was carried out on selected examples. A polymer sample (100 to 150 mg) was introduced into the reactor vessel of the Polymer Char crystal-TREF unit. The reactor vessel was filled with 35 ml 1,2,4-trichlorobenzene (TCB), heated to the desired dissolution temperature (e.g. 150° C.) for 2 hours. The solution (1.0 ml) was then loaded into the TREF column filled with stainless steel beads. After allowed to equilibrate at a given stabilization temperature (e.g. 110° C.) for 45 minutes, the polymer solution was allowed to crystallize with a temperature drop from the stabilization temperature to 30° C. (0.2° C./minute). After equilibrating at 30° C. for 90 minutes, the crystallized sample was eluted with TCB from 30 to 110° C., which was divided into 15 to 20 fractions. For each fraction, the TREF column was heat to the specific dissolution temperature and maintained at that temperature for 55 minutes before the solution of the fraction was eluted and introduced to a GPC system through a heated transfer line. The polymer fractions were chromatographed at 140° C. on a PL 220 high-temperature chromatography unit equipped with four SHODEX® columns (HT803, HT804, HT805 and HT806) using TCB as the mobile phase with a flow rate of 1.0 mL/minute, with a differential refractive index (DRI) as the concentration detector. The SEC columns were calibrated with narrow distribution polystyrene standards. The polystyrene molecular weights were converted to polyethylene molecular weights using the Mark-Houwink equation, as described in the ASTM standard test method D6474. The data were processed using CIRRUS® GPC software and Excel spreadsheet.

Polyethylene composition density (g/cm.sup.3) was measured according to ASTM D792.

Melt indexes $I_2$, $I_6$ and $I_{21}$ for the polyethylene composition were measured according to ASTM D1238.

The density and melt index of the first and second ethylene polymers that include the polyethylene composition were determined based on composition models. The following equations were used to calculate the density and melt index $I_2$ (Reference U.S. Pat. No. 8,022,143 B2, by Wang, assigned to NOVA Chemicals and published Sep. 20, 2011):

$$\text{Density} = 0.979863 - 5.95808 \times 10^{-3} \left(\frac{SCB}{1000C}\right)^{0.65} - 3.8133 \times 10^{-4} [\log_{10}(M_n)]^3 - 5.77986 \times 10^{-6} (M_w/M_n)^3 + 5.57395 \times 10^{-3} (M_z/M_w)^{0.25}$$

$$\log_{10}(\text{Melt Index } I_2) = 22.326528 + 3.467 \times 10^{-3} [\log_{10}(M_n)]^3 - 4.322582 [\log_{10}(M_w)] - 1.80061 \times 10^{-1} [\log_{10}(M_z)]^2 + 2.6478 \times 10^{-2} [\log_{10}(M_z)]^3$$

where Mn, Mw, Mz, and SCB/1000C are the de-convoluted values of the individual ethylene polymer components, as obtained from the results of the de-convolution described above.

Primary melting peak (° C.), heat of fusion (J/g) and crystallinity (%) were determined using differential scanning calorimetry (DSC) as follows: the instrument was first calibrated with indium; after which a polymer specimen is equilibrated at 0° C.; the temperature was increased to 200° C. at a heating rate of 10° C./min; the melt was then kept at that temperature for five minutes; the melt was then cooled to 0° C. at a cooling rate of 10° C./min and kept at 0° C. for five minutes; the specimen was heated a second time to 200° C. at a heating rate of 10° C./min. The melting peak (Tm), heat of fusion and crystallinity reported are calculated based on the second heating cycle.

Plaques molded from the polyethylene compositions were tested according to the following ASTM methods: Bent Strip Environmental Stress Crack Resistance (ESCR), ASTM D1693; Flexural properties, ASTM D 790; Tensile properties, ASTM D 638. ESCR test under the "B" conditions of ASTM D1693 were conducted using a 100% solution of octoxynol-9 (sold under the trademark IGEPAL® CO 360) and using a 10% solution of octoxynol-9. It will be recognized by skilled persons that the test using the 10% solution ("$B_{10}$") is more severe than the test using the 100% solution—i.e. $B_{10}$ values are typically lower than $B_{100}$.

Rotomolded parts were prepared in a rotational molding machine sold under the tradename ROTOSPEED® RS3-160 by Ferry Industries Inc. The machine has two arms which rotate about a central axis within an enclosed oven. The arms are fitted with plates which rotate on an axis that is roughly perpendicular to the axis of rotation of the arm. Each arm is fitted with six cast aluminum molds that produce plastic cubes having dimensions of 12.5 inches (31.8 cm)×12.5 inches×12.5 inches. The arm rotation was set to about 8 revolutions per minute (rpm) and the plate rotation was set to about 2 rpm. These molds produce parts having a nominal thickness of about 0.25 inches (0.64 cm) when initially filled with a standard charge of about 3.7 kg of polyethylene resin in powder form (35 US mesh size). The temperature within the enclosed oven was maintained at a temperature of 560° F. (293° C.). The molds and their content were heated for a specified period of time, until full powder densification is achieved. The molds were subsequently cooled in a controlled environment prior to removing the parts. Specimens were collected from the molded parts for density and color measurements The ARM impact test was performed in accordance with ASTM D5628 at a test temperature of −40° C.

Test specimens to be impacted are to be from a rotationally molded part. Test specimens should be conditioned to reach uniform chilling of the specimen cross-section to not less than −40° F.±3.5° F. (−40° C.±2° C.).

The impact testing technique on rotationally molded part is commonly called the Bruceton Staircase Method or the Up-and-Down Method. The procedure establishes the height of a specific dart that will cause 50% of the specimens to fail. Percentage ductility represent the percentage of failures that showed ductile characteristics. Samples are impact tested using the drop weight impact tester. If the sample did not fail at a given height/weight, either the height or weight is increased incrementally until failure occurs. Once failure has occurred, the height/weight is decreased by the same increment and the process is repeated until all samples are utilized. The falling dart should impact the surface of the part that was in contact with the mold when it was molded. For polyethylene, a ductile failure is the failure desired mode that generally occurs on properly processed samples. A brittle failure or failure by shattering, generally indicate that the optimum properties have not been obtained by the processing parameters used.

Ductile: signified by penetration of the dart though the specimen leaving a hole with stringy fibers at point of failure rather than cracking outwardly from point of failure. The area under the dart has elongated and thinned at the point of failure.

Brittle: signified by the part physically coming apart or cracking at the point of impact. Sample has no or very little elongation.

The Resin

Bimodal polyethylene compositions were prepared at a dual reactor pilot plant. In this dual reactor process, the content of the first reactor flows into the second reactor, both of which are well mixed. The process operates using continuous feed streams. The catalyst (cyclopentadienyl tri (tertiary Butyl)phosphimine titanium dichloride) with activator was fed to both reactors. The overall production rate was about 90 kg/hr.

The polymerization conditions are provided in Table 1.

The polymer compositions prepared at the pilot plant were stabilized using a conventional additive package for rotational molding applications prior to carrying out plaque testing trials.

The properties of the resulting resins are compared to internal NOVA Chemicals experimental resins which are referred to as Comparative Examples 1 to 4, respectively. Results are set forth in Table 2. The properties of pressed plaques as well as rotomolded parts made from the polyethylene compositions are presented in Table 3.

TABLE 1

|  | Inventive Example 1 | Comp. Example 1 | Comp. Example 2 | Comp. Example 3 | Comp. Example 4 |
|---|---|---|---|---|---|
| Ethylene split between first reactor (R1) and second reactor (R2) | 0.30/0.70 | 0.30/0.70 | 0.30/0.70 | 0.25/0.75 | 0.30/0.70 |
| Octene split between first Reactor (R1) and second reactor (R2), and third reactor (R3) | 1/0 | 1/0 | 1/0 | 1/0 | 1/0 |
| Octene to ethylene ratio in fresh feed | 0.144 | 0.110 | 0.080 | 0.115 | 0.190 |
| Hydrogen in reactor 1 (ppm) | 0.9 | 0.8 | 1.9 | 0.6 | 0.6 |
| Hydrogen in reactor 2 (ppm) | 2.9 | 7.8 | 2.9 | 0.5 | 9.0 |
| Reactor 1 temperature (° C.) | 138 | 140 | 148 | 140 | 138 |
| Reactor 2 temperature (° C.) | 210 | 212 | 208 | 210 | 208 |
| Ethylene Conversion in Reactor 1 (%) | 90 | 90 | 91 | 92 | 87 |
| Ethylene Conversion in Reactor 2 (%) | 88.0 | 89.9 | 85.3 | 88.7 | 85.0 |
| Catalyst Concentration in reactor 1 (ppm) | 0.14 | 0.20 | 0.12 | 0.18 | 0.12 |
| Catalyst Concentration in reactor 2 (ppm) | 0.69 | 0.47 | 0.40 | 0.90 | 0.46 |

TABLE 2

|  | Inventive Example 1 | Comp. Example 1 | Comp. Example 2 | Comp. Example 3 | Comp. Example 4 |
|---|---|---|---|---|---|
| Density (g/cm$^3$) | 0.9349 | 0.9398 | 0.9397 | 0.9361 | 0.9358 |
| Melt Index I$_2$ (g/10 min) | 4.8 | 5.6 | 5.3 | 5.2 | 5.1 |
| Melt Index I$_6$ (g/10 min) | 21.2 | 24.2 | 20.0 | 22.6 | 26.3 |
| Melt Index I$_{21}$ (g/10 min) | 159 | 189 | 109 | 153 | 256 |
| Melt Flow Ratio (I$_{21}$/I$_2$) | 33.1 | 33.9 | 20.3 | 29.6 | 51.0 |
| Branch Freq/1000 C. (FTIR) | 6.2 | 4.6 | 3.8 | 6 | 6.7 |
| Comonomer ID | Octene | Octene | Octene | Octene | Octene |
| Comonomer (mol %) | 1.2 | 0.9 | 0.8 | 1.2 | 1.3 |
| Comonomer (wt. %) | 4.8 | 3.6 | 2.9 | 4.6 | 5.2 |
| Internal Unsat/1000 C. (FTIR) | 0.027 | 0.019 | 0.02 | 0.034 | 0.018 |
| M$_n$ (GPC) | 27,251 | 24,106 | 33,331 | 27,327 | 23,655 |
| M$_w$ (GPC) | 68,845 | 67,459 | 69,334 | 74,040 | 71,156 |
| M$_z$ (GPC) | 154,100 | 170,027 | 125,745 | 233,811 | 212,486 |
| Polydispersity Index (M$_w$/M$_n$) | 2.5 | 2.8 | 2.1 | 2.7 | 3.0 |

TABLE 3

|  | Inventive Example 1 | Comp. Example 1 | Comp. Example 2 | Comp. Example 3 | Comp. Example 4 |
|---|---|---|---|---|---|
| Flex Secant Mod 1% (MPa) | 784 | 898 | 891 | 792 | 694 |
| Flex Secant Mod 1% (MPa) Dev. | 16 | 8 | 22 | 15 | 37 |
| ESCR Cond B10 (hrs) 10% CO-630 | 79 | 22 | 21 | 20 | 144 |
| ESCR Cond A100 (hrs) 100% CO-630 | >1000 | >1000 | 78 | 838 | >1000 |
| ESCR Cond B100 (hrs) 100% CO-630 | >1000 | >1000 | 102 | >1000 | >1000 |
| Low Temperature ARM Impact Performance Ductility (%) | 100 | 100 | 100 | 90 | 27 |

Note:
The comparative example from U.S. Pat. No. 9,540,505 also provides ESCR of greater than 1000 hours for conditions A100 and B100 (however, the B10 value is only 22 hours as shown in Table 3).

INDUSTRIAL APPLICABILITY

Polyethylene compositions having a high flow index, which is desirable for ease of molding, are disclosed. Rotomolded parts prepared from the compositions exhibit good Environmental Stress Crack Resistance and good ductility. The compositions may be used to prepare a wide variety of molded goods, such as kayaks; toys; and storage tanks.

The invention claimed is:

1. A bimodal polyethylene composition having a density from 0.934 to 0.940 g/cm$^3$, a melt index I$_2$ determined according to ASTM D 1238 (2.16 kg 190° C.—I$_2$) from 4.0 to 7.0 g/10 min, and I$_{21}$ determined according to ASTM D 1238 (21.6 kg 190° C.—I$_{21}$) from 140 to 170 g/10 min, an I$_{21}$/I$_2$ from 27 to 36, a bent strip ESCR as determined by ASTM D 1693 in 100% octoxynol-9 for conditions A and B of greater than 1,000 hours, a bent strip ESCR as determined by ASTM D1693 in 10% octynol-9 for conditions B10 of greater than 70 hours, a number average molecular weight (Mn) from 11,000 to 35,000 as determined by GPC, a weight average molecular weight (Mw) from 55,000 to 82,000 as determined by GPC, an overall Mw/Mn from 2.2 to 2.6, comprising from 4 to 5 wt. % of one or more C$_{4-8}$ alpha olefin comonomers as determined by FTIR which de-convoluted into a first component and a second component consists of: (i) from 20 to 45 wt. % of the first component consisting of from 1 to 25 wt. % of one or more C$_{4-8}$ alpha olefin comonomers and the balance ethylene, the first component having a density as determined according to ASTM D 792 from 0.915 to 0.925 g/cm$^3$; a weight average molecular weight (Mw) from 180,000 to 220,000 g/mol, a Mw/Mn of from 2 to 3; and (ii) from 80 to 55 wt. % of the second component comprising one or more of C$_{4-8}$ alpha olefin comonomers and the balance ethylene the second component having a density as determined according to ASTM D 792 from 0.940 to 0.945 g/cm$^3$, a weight average molecular weight (Mw) from 30,000 to 50,000, and a Mw/Mn of from 2 to 3.

2. The bimodal polyethylene composition according to claim 1, wherein the first component is present in an amount from 20 to 35 wt. %.

3. The bimodal polyethylene composition according to claim 2, wherein said one or more comonomers in the first and second component consists essentially of 1-octene.

4. The bimodal polyethylene composition according to claim 3, wherein the second component (ii) is present in an amount from 80 to 65 wt. %.

5. A process to prepare a bimodal polyethylene composition having a density from 0.934 to 0.940 g/cm$^3$, a melt index I$_2$ determined according to ASTM D 1238 (2.16 kg 190° C.—I$_2$) from 4.0 to 7.0 g/10 min, and I$_{21}$ determined according to ASTM D 1238 (21.6 kg 190° C.—I$_{21}$) from 140 to 170 g/10 min, an I$_{21}$/I$_2$ from 27 to 36, a bent strip ESCR as determined by ASTM D 1693 in 100% octoxynol-9 for conditions A and B of greater than 1,000 hours, a bent strip ESCR as determined by ASTM D1693 in 10% octoxynol-9 for condition B$_{10}$ of greater than 70 hours, a number average molecular weight (Mn) from 11,000 to 35,000 as determined by GPC, a weight average molecular weight (Mw) from 55,000 to 82,000 as determined by GPC, an overall Mw/Mn from 2.2 to 2.6, comprising from 4 to 5 wt. % of one or more C$_{4-8}$ alpha olefin comonomers as determined by FTIR which when de-convoluted into a first component and a second component consists of: (i) from 20 to 45 wt. % of the first component consisting of from 1 to 25 wt. % of one or more C$_{4-8}$ alpha olefin comonomers and the balance ethylene, the first component having a density as determined according to ASTM D 792 from 0.915 to 0.925 g/cm$^3$; a weight average molecular weight (Mw) from 180,000 to 220,000 g/mol, a Mw/Mn of from 2 to 3; and (ii) from 80 to 55 wt. % of the second component comprising one or more of C$_{4-8}$ alpha olefin comonomers and the balance ethylene the second component having a density as determined according to ASTM D 792 from 0.940 to 0.945 g/cm$^3$, a weight average molecular weight (Mw) from 30,000 to 50,000, and a Mw/Mn of from 2 to 3; said process comprising feeding ethylene and one or more $C_{4-8}$ comonomer(s) to two sequential solution phase polymerization reactors in the presence of a single site catalyst comprising a phosphinimine ligand together with one or more activators.

6. The process of claim 5 wherein said catalyst is defined by the formula:

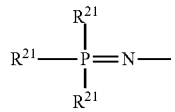

wherein M is selected from the group consisting of Ti, Zr and Hf, PI is a phosphinimine ligand of the formula:

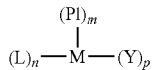

wherein each $R^{21}$ is independently selected from the group consisting of a hydrogen atom; a halogen atom; hydrocarbyl radicals, typically, $C_{1-10}$, which are unsubstituted by or further substituted by a halogen atom; $C_{1-8}$ alkoxy radicals; $C_{6-10}$ aryl or aryloxy radicals; amido radicals; silyl radicals of the formula:

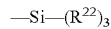

wherein each $R^{22}$ is independently selected from the group consisting of hydrogen, a $C_{1-8}$ alkyl or alkoxy radical and $C_{6-10}$ aryl or aryloxy radicals; and a germanyl radical of the formula:

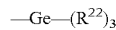

wherein $R^{22}$ is as defined above; L is a monoanionic cyclopentadienyl-type ligand independently selected from the group consisting of cyclopentadienyl-type ligands, Y is independently selected from the group consisting of activatable ligands; m is 1 or 2; n is 0 or 1; p is an integer and the sum of m+n+p equals the valence state of M.

7. The process of claim 5 wherein said one or more activators comprise an alumoxane and an ionic activator.

8. The process of claim 5, wherein the process is conducted at a temperatures between 12° and 250° C.

* * * * *